No. 701,958. Patented June 10, 1902.
C. P. STEINMETZ.
AUTOMATIC CUT OUT.
(Application filed Mar. 6, 1899.)
(No Model.)
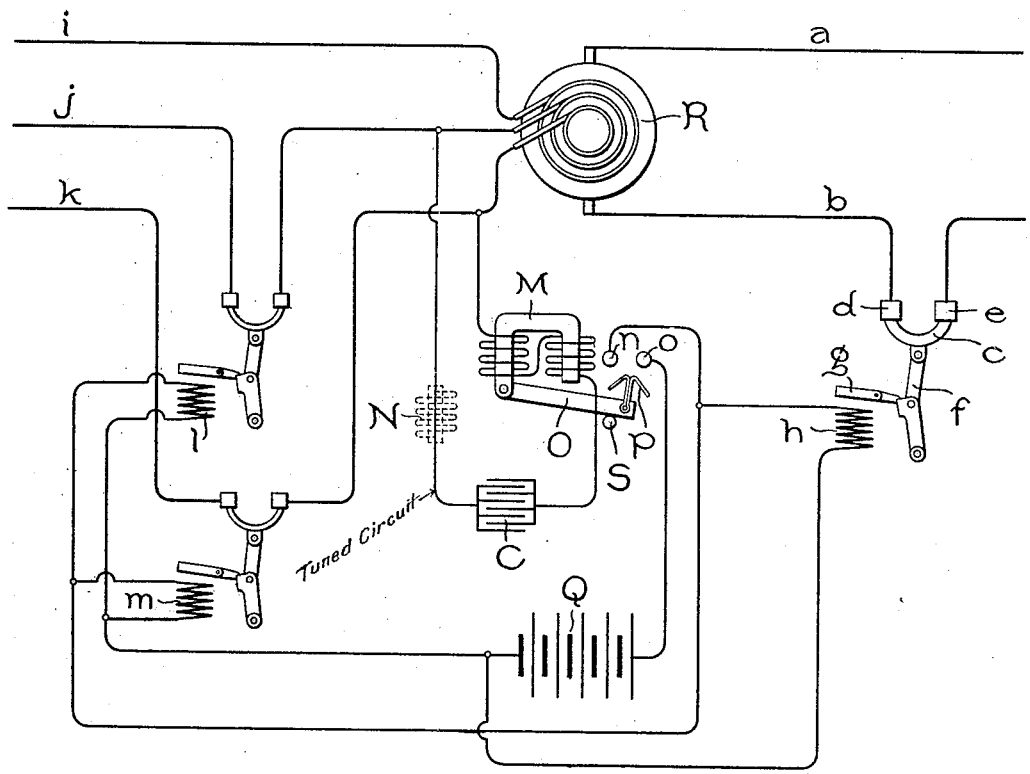
Witnesses:
A. H. Abell,
A. F. Macdonald.
Inventor.
Charles P. Steinmetz
by Albert G. Davis
Atty.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

AUTOMATIC CUT-OUT.

SPECIFICATION forming part of Letters Patent No. 701,958, dated June 10, 1902.

Application filed March 6, 1899. Serial No. 707,880. (No model.)

*To all whom it may concern:*

Be it known that I, CHARLES P. STEINMETZ, a citizen of the United States, residing at Schenectady, county of Schenectady, State of New York, have invented certain new and useful Improvements in Automatic Cut-Outs, (Case No. 1,037,) of which the following is a specification.

In the practical operation of rotary converters I have found it desirable to provide some automatically-actuated means for cutting the machine out of circuit or otherwise reducing its speed upon a predetermined rise in speed—as, for example, twenty per cent. above the normal. The causes which give rise to changes in speed in a rotary converter are dependent upon the circumstances under which the machine is operated. If the machine is used in the ordinary manner, with alternating current supplied thereto and direct currents taken from the direct-current end, the machine will run in synchronism with the frequency of the alternating current supplied, and its speed will change only with changes in frequency of the alternating current. It sometimes happens, however, that the generators supplying the alternating current speed up abnormally, thus requiring some safety device in connection with the rotary converters or other machines driven therefrom in order to prevent too great rise in speed and consequent destruction of the machines by the action of centrifugal force. It also sometimes happens that the alternating supply-mains of a rotary converter are interrupted. If the direct-current end of the rotary converter is connected to an independent circuit, no harm will result. If, however, the direct-current end of the rotary converter be connected with the direct-current end of the rotary converters or, indeed, with any other source of direct current, the immediate result is a reversal of current in the direct-current side of the rotary converter, which thereupon runs as a direct-current motor. If the machine is provided with a series field-winding, as usual, the field strength is reduced by reversal of current through this winding, and the machine therefore speeds up. If, on the other hand, the function of the rotary converter is inverted by normally supplying the same with direct current and deriving alternating currents therefrom, the speed of the machine is varied not only by changes in electromotive force of the direct current supplied, but also by changes in the character of the load on the alternating-current end of the machine. Thus if an inductive load is fed from the alternating mains the lagging currents produced thereby react upon the field-magnets of the rotary converter and cause a weakening of the same, the immediate result of which is a speeding up of the rotary converter, such as would take place in a direct-current motor if the field were weakened. On the other hand, if leading currents flow in the alternating mains the effect of the same is to strengthen the field of the rotary converter and to correspondingly decrease its speed. This has been a serious and in some cases a prohibitive difficulty in the employment of inverted rotary converters.

In order to provide a speed-limiting mechanism suitable for employment in the cases above mentioned, and, in fact, in connection with any dynamo-electric machine generating alternating currents or to which alternating currents are supplied, I make use of a circuit connected across the alternating mains and responsive to the frequency of the electromotive forces impressed thereon; and this circuit is arranged to automatically actuate or control suitable devices for cutting the machine or machines out of circuit or for otherwise reducing their speed when the frequency of the alternating electromotive forces reaches a predetermined abnormal value.

My invention will be more readily understood by reference to the following description, taken in connection with the accompanying drawing, while its scope will be clearly and particularly pointed out in the appended claims.

For purposes of illustration I have shown my invention as applied to a rotary converter; but it will be readily understood that the same may be utilized in connection with any other alternating-current dynamo-electric machine.

At R, I have indicated diagrammatically a rotary converter; but for the sake of convenience I have omitted showing the field-windings, which, however, may consist of the usual shunt and series coils. The particular construction of the rotary converter is unimportant so far as my invention is concerned.

The direct-current mains are indicated at $a\,b$, and in series with the main $b$ I have shown a suitable circuit-breaker or other cut-out device, the same consisting of a bridging-piece $c$, making contact with the terminals $d\,e$ and held in place against the same by a toggle connection $f$. The knuckle of the toggle is held in place by the tripping-lever $g$, the latter being actuated by current in the coil $h$ in a manner to be hereinafter described.

The alternating-current mains are indicated at $i$, $j$, $k$, and in series with two of the mains $j\,k$ are placed circuit-breaking devices, each similar in all respects to that placed in the direct-current main $b$. It is unnecessary to describe the circuit-breakers in detail, since they may be of any suitable and well-known construction. It will suffice simply to state that the circuit-breakers are actuated by means of current flowing in the respective coils $l$ and $m$.

The means which I have provided for energizing the coils $h\,l\,m$ for tripping their respective circuit-breakers consists, primarily, of a tuned circuit placed across one pair of the three-phase mains $i\,j\,k$—as, for instance, across the mains $j\,k$. This circuit includes a condenser C and a device giving rise to inductive reactance, which is here shown as a magnet M. I may, if desired, provide an additional inductive device of any suitable form, as indicated in dotted lines at N. The core of the magnet M is vertically arranged with two downwardly-projecting legs, to one of which is pivoted one end of an armature O, the other end of which normally rests against a suitable stop S and is by the latter maintained at a suitable distance from the other leg of the magnet-core. The free end of the armature O carries a wedge-shaped contact P, adapted to be brought into engagement with and to connect the two terminals $n$ and $o$, thus serving to complete the circuit of a local battery Q or any other suitable source of electromotive force through the circuit-breaker coils $h\,l\,m$, which, as here shown, are arranged in multiple with each other, but which might equally as well, if desired, be arranged in series. The capacity reactance and the inductive reactance in the tuned circuit are so proportioned with respect to each other as to bring the circuit into resonance at that frequency of the electromotive force in the alternating-current mains at which it is desired to cut out or otherwise act upon the rotary converter or other dynamo-electric machine to reduce its speed. When this condition of resonance is reached, the current in the tuned circuit increases very greatly, and the parts are so proportioned that this increase of current is sufficient to cause the armature O of the magnet M to be attracted, thereby causing the contact P to close the local circuit fed by the battery Q or other source of electromotive force. Current then passes through the circuit-breaker coils $h\,l\,m$ and operates the circuit-breaking contacts used in connection therewith, thus opening the alternating-current and the direct-current mains of the machine.

While I have shown a local circuit for operating the circuit-breakers in the mains of a dynamo-electric machine, it will of course be obvious that any other suitable means controlled from the tuned circuit may be employed for carrying out the same functions.

Having thus described my invention, what I claim as new, and desire to secure by Letters Patent of the United States, is—

1. The combination of alternating-current and direct-current mains, a dynamo-electric machine connected to both sets of mains and driven by energy transmitted over one of said sets of mains, a circuit supplied with current from said alternating-current mains, means for causing the current in said circuit to increase with increase of frequency of current in said alternating-current mains, and means controlled by current in said circuit for interrupting the supply of energy to said dynamo-electric machine.

2. The combination of a dynamo-electric machine, alternating-current and direct-current mains extending therefrom, a circuit-interrupting device for one of said sets of mains, a circuit connected across the alternating-current mains, means for causing current in said circuit to increase with increase of frequency of the alternating electromotive forces impressed upon said alternating-current mains, and means actuated by current in said circuit for operating said circuit-interrupting device.

3. The combination of alternating-current mains, means for impressing thereon alternating electromotive forces of normal frequency, a circuit connected to said mains, means for causing the current in said circuit to increase with increase of frequency of current in said mains above the normal, and means operative upon increase of current in said circuit for interrupting the flow of current in said mains.

4. The combination of a dynamo-electric machine, conductors in connection therewith on which alternating electromotive forces are impressed of a frequency corresponding to the speed of the machine, a tuned circuit in connection with said conductors, a local circuit controlled by current in the tuned circuit, and means controlled by said local circuit for interrupting the driving power of said machine.

5. The combination of a rotary converter of variable speed, alternating-current and direct-current mains, circuit-interrupting devices for said mains, a tuned circuit connected across two of the alternating mains, and means operated by current in said circuit for controlling the circuit-interrupting devices.

6. The combination of a rotary converter alternating-current and direct-current mains, a tuned circuit supplied with energy from the alternating mains, and means responsive to current in said tuned circuit for interrupting both the alternating-current and the direct-current mains.

In witness whereof I have hereunto set my hand this 4th day of March, 1899.

CHARLES P. STEINMETZ.

Witnesses:
BENJAMIN B. HULL,
MABEL E. JACOBSON.